(12) United States Patent
Ee et al.

(10) Patent No.: US 9,190,086 B1
(45) Date of Patent: Nov. 17, 2015

(54) GSA SUSPENSION HAVING SLIDER CLEARANCE FOR SHOCK PERFORMANCE

(71) Applicant: Magnecomp Corporation, Murrieta, CA (US)

(72) Inventors: Kuen Chee Ee, Chino, CA (US); Peter Hahn, Ayutthaya (TH); Long Zhang, Murrieta, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/713,820

(22) Filed: May 15, 2015

Related U.S. Application Data

(63) Continuation-in-part of application No. 14/491,932, filed on Sep. 19, 2014, now Pat. No. 9,129,624, which is a continuation of application No. 13/684,016, filed on Nov. 21, 2012, now Pat. No. 8,879,210.

(60) Provisional application No. 61/565,349, filed on Nov. 30, 2011, provisional application No. 62/009,176, filed on Jun. 7, 2014.

(51) Int. Cl.
*G11B 5/48* (2006.01)

(52) U.S. Cl.
CPC ............ *G11B 5/4873* (2013.01); *G11B 5/4826* (2013.01)

(58) Field of Classification Search
CPC ...... G11B 5/482; G11B 5/4873; G11B 5/483; G11B 5/4833; G11B 5/53
USPC .................................. 360/294.4, 245.3, 234.6
See application file for complete search history.

(56) References Cited

U.S. PATENT DOCUMENTS

| | | |
|---|---|---|
| 6,069,771 A | 5/2000 | Boutaghou et al. |
| 6,078,473 A | 6/2000 | Crane et al. |
| 6,222,706 B1 | 4/2001 | Stefansky et al. |
| 6,297,936 B1 | 10/2001 | Kant et al. |
| 6,327,120 B1 | 12/2001 | Koganezawa et al. |
| 6,359,758 B1 | 3/2002 | Boutaghou |
| 6,376,964 B1 | 4/2002 | Young et al. |
| 6,512,659 B1 | 1/2003 | Hawwa et al. |
| 6,549,375 B1 | 4/2003 | Crane et al. |
| 6,597,539 B1 | 7/2003 | Stupp et al. |
| 6,618,220 B2 | 9/2003 | Inagaki et al. |
| 6,621,661 B1 | 9/2003 | Ichikawa et al. |
| 6,738,231 B2 | 5/2004 | Arya et al. |
| 6,760,196 B1 | 7/2004 | Niu et al. |
| 6,785,096 B2 | 8/2004 | Kuwajima et al. |
| 6,831,807 B2 | 12/2004 | Koso et al. |
| 6,917,498 B2 | 7/2005 | Kuwajima et al. |

(Continued)

*Primary Examiner* — Angel Castro
(74) *Attorney, Agent, or Firm* — Intellectual Property Law Offices of Joel Voelzke, APC

(57) ABSTRACT

A dual stage actuated (DSA) suspension includes two PZT microactuators that are attached at their first ends to a non-gimbaled portion of the suspension, and are attached at their second ends to the gimbaled portion of the suspension such as the gimbal tongue through flexible connectors that can be formed integrally with the suspension's flexure. The flexible connectors are flexible enough so as not to interfere with the suspension's gimballing action. The flexible connectors transmit force from the PZTs to the gimbal as the PZTs expand and contract in order to rotate the gimbal and thus effect fine movements of the head slider. The flexible connectors are positioned laterally outwardly of the leading edge of the slider, thereby protecting both the connectors and the PZTs from damage induced by the slider striking the connectors during a shock event.

20 Claims, 10 Drawing Sheets

Bottom Plan View

(56) References Cited

U.S. PATENT DOCUMENTS

| | | |
|---|---|---|
| 6,939,667 B2 | 9/2005 | Taima |
| 6,952,330 B1 | 10/2005 | Riddering et al. |
| 6,961,221 B1 | 11/2005 | Niu et al. |
| 7,005,304 B2 | 2/2006 | Nakatani et al. |
| 7,006,333 B1 | 2/2006 | Summers |
| 7,006,335 B2 | 2/2006 | Kuwajima et al. |
| 7,027,267 B2 | 4/2006 | Kuwajima et al. |
| 7,046,485 B2 | 5/2006 | Kuwajima et al. |
| 7,046,486 B1 | 5/2006 | Coffey |
| 7,050,266 B2 | 5/2006 | Ichikawa et al. |
| 7,050,271 B2 | 5/2006 | Miyano et al. |
| 7,072,149 B2 | 7/2006 | Kuwajima et al. |
| 7,072,150 B2 | 7/2006 | Kuwajima et al. |
| 7,106,557 B2 | 9/2006 | Kuwajima et al. |
| 7,161,765 B2 | 1/2007 | Ichikawa et al. |
| 7,230,800 B2 | 6/2007 | Hirano et al. |
| 7,298,593 B2 | 11/2007 | Yao et al. |
| 7,312,955 B2 | 12/2007 | Kuwajima et al. |
| 7,365,930 B2 | 4/2008 | Ishii et al. |
| 7,375,930 B2 | 5/2008 | Yang et al. |
| 7,382,583 B2 | 6/2008 | Hirano et al. |
| 7,403,357 B1 | 7/2008 | Williams |
| 7,551,405 B2 | 6/2009 | Yao et al. |
| 7,609,487 B2 | 10/2009 | Yao et al. |
| 7,684,158 B1 | 3/2010 | Lauer |
| 7,706,105 B2 | 4/2010 | Maslov et al. |
| 7,839,604 B1 | 11/2010 | Koffey et al. |
| 7,843,666 B2 | 11/2010 | Yao et al. |
| 7,881,017 B2 | 2/2011 | Bhatia et al. |
| 8,085,508 B2 | 12/2011 | Hatch |
| 8,089,732 B2 | 1/2012 | Yao et al. |
| 8,094,416 B2 | 1/2012 | Hanya et al. |
| 8,098,461 B2 | 1/2012 | Nogima et al. |
| 8,130,469 B2 | 3/2012 | Yao |
| 8,134,809 B2 | 3/2012 | Yao et al. |
| 8,446,694 B1 | 5/2013 | Tian et al. |
| 8,797,690 B2 | 8/2014 | Tao et al. |
| 8,854,826 B2 | 10/2014 | Ohsawa |
| 8,879,210 B1 | 11/2014 | Hahn et al. |
| 8,896,970 B1 | 11/2014 | Miller et al. |
| 8,947,831 B1* | 2/2015 | Ee et al. .................... 360/245.3 |
| 8,995,094 B1* | 3/2015 | Chen et al. ................ 360/294.4 |
| 9,001,471 B2* | 4/2015 | Miller et al. .............. 360/294.4 |
| 2006/0077594 A1 | 4/2006 | White et al. |
| 2011/0096438 A1 | 4/2011 | Takada et al. |
| 2014/0022670 A1 | 1/2014 | Takikawa et al. |
| 2014/0104722 A1 | 4/2014 | Wright et al. |
| 2014/0139953 A1 | 5/2014 | Hatch |
| 2014/0160599 A1 | 6/2014 | Higuchi et al. |
| 2014/0168813 A1 | 6/2014 | Tao et al. |
| 2014/0168815 A1 | 6/2014 | Kudo |
| 2015/0179196 A1* | 6/2015 | Okuno et al. ............. 360/294.4 |
| 2015/0213818 A1* | 7/2015 | Imai et al. ................ 360/294.4 |

* cited by examiner

Top Plan View

Bottom Plan View

Bottom Plan View

Bottom Plan View

GSA SUSPENSION HAVING SLIDER CLEARANCE FOR SHOCK PERFORMANCE

CROSS-REFERENCE TO RELATED APPLICATIONS

This application is a continuation-in-part of U.S. patent application Ser. No. 14/491,932 filed Sep. 19, 2014, which is a Continuation of application Ser. No. 13/684,016 filed Nov. 21, 2012, now U.S. Pat. No. 8,879,210. This application also claims benefit of U.S. Provisional Patent Application No. 62/009,176 filed Jun. 7, 2014, which is hereby incorporation by reference as if set forth fully herein.

BACKGROUND OF THE INVENTION

1. Field of the Invention

This invention relates to the field of dual stage actuator (DSA) type suspensions for disk drives including hard disk drives. More particularly, this invention relates to the field of a dual stage actuator suspension in which the microactuators are connected to the gimbaled region through flexible connectors.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest to base plate 12 which is swaged or otherwise mounted to an actuator arm. The "distal" end of a suspension or load beam is the end that is opposite the proximal end, i.e., the "distal" end is the cantilevered end. "Proximal" as a relative term means closer to the actuator arm to which the suspension is affixed, and "distal" as a relative term means closer to the cantilevered end of the suspension.

Suspension 105 is coupled to an actuator arm 103, which in turn is coupled to a voice coil motor 112 that moves the suspension 105 in an arc in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider and to keep it properly aligned over the desired data track on the spinning disk. The microactuator(s) provide much finer control and increased bandwidth of the servo control loop than does the voice coil motor alone, which only effects relatively coarse movements of the suspension and hence the magnetic head slider. Various locations have been proposed for the microactuator(s). The PZTs can be located within baseplate 105, on the load beam 107, or at or near the head gimbal assembly which is located at the distal end of load beam 107. Mei FIGS. 1 and 10 show embodiments in which the microactuators extend from the mount plate, and in which the microactuators are mounted in the middle of the load beam, respectively. Patent publication no. US2001/0096438 by Takada et al. and US2009/0244786 by Hatch show DSA suspensions in which the microactuator are located on the gimbal. U.S. Pat. No. 6,760,196 to Niu et al. shows a collocated microactuator, i.e., a microactuator that lies directly underneath the head slider. U.S. Pat. No. 6,376,964 to Young at al. shows microactuators that bend from side to side and that extend from the distal end of the suspension to the gimbal to effect fine movements of the slider through a hinged linkage structure.

FIG. 2 is a top plan view of the prior art DSA suspension 105 of FIG. 1. Microactuators 14, which are usually but not necessarily piezoelectric (PZT) devices, are mounted on microactuator mounting shelves 16 that are formed in mount plate 12. Microactuators 14 span gap 18.

DSA suspensions having the microactuators on the mount plate such as in FIG. 2 generally have high stroke length per unit of input voltage. This will be referred to simply as having high stroke length for shorthand. Such suspensions, however, usually suffer from low servo bandwidth due to resonances in the part of the suspension that is distal to the PZTs. DSA suspensions in which the microactuators are mounted on the gimbal, or act directly on the gimbal, are sometimes referred to as gimbal-mounted dual stage actuated suspensions, or "GSA" suspensions. Slider based (collocated) DSA suspension designs variously have the disadvantages of: requiring additional piece parts; requiring complicated tracing routing, electrical connections, and slider bonding; having heavy slider/tongue assemblies which is undesirable because the extra mass can affect dynamic performance especially under shock conditions; and requiring one or more dedicated tongue features that are prone to manufacturing tolerance issues. Other gimbal-based designs require thin-film PZTs for high stroke lengths, and/or can be difficult to adjust for pitch and roll static attitude.

In the discussion which follows, the microactuator(s) will be referred to as two PZTs for shorthand, although it will be understood that the invention applies equally to suspensions having only a single microactuator and/or microactuator(s) that are not necessarily PZT devices.

As used herein, the term "proximal" means closest to the actuator arm at which the suspension is mounted, i.e., toward the bottom of FIG. 2, and "distal" means closest to the cantilevered end of the suspension, i.e., toward the top of FIG. 2.

SUMMARY OF THE INVENTION

The present invention is of a DSA suspension have one or more PZTs that extend from the load beam, or more generally from a non-gimbaled portion of the suspension, and more specifically from a non-gimbaled or rigid portion of the flexure, to a gimbaled part of the suspension such as the slider tongue. The PZTs are connected to the gimbaled portion through thin ribbons of stainless steel and/or other materials that act as flexible connectors to transmit tensile and compressive forces, and thereby transmit push/pull movement of the PZTs, to the gimbaled portion to which the head slider is attached, the connectors being flexible enough to allow the gimbal to pitch and roll relatively freely and thus not interfere with the normal gimbal action as the head slider pitches and rolls in response to surface irregularities in the surface of the data disk, which is necessary for proper gimbal and suspension operation. The invention provides a DSA suspension with good stroke length per unit of input voltage to the PZTs, high servo bandwidth, and good shock susceptibility. The PZTs can be relatively inexpensive single-layer bulk PZTs as compared to more costly PZT configurations such as thin-film or multilayer PZTs which are called for in some prior designs.

In one aspect therefore, the invention is of a dual stage actuator (DSA) type suspension for a disk drive, the suspension including a load beam and a flexure, the flexure having a rigid part that is secured to the load beam and a gimbaled part that is allowed to pitch and roll freely via gimballing action, a pair of linear actuators such as bulk piezoelectric (PZT) devices attached at one end thereof to the rigid part of the flexure or other rigid part of the load beam and being attached at opposite ends to the gimbaled part through ribbon-like flexible connectors. The flexible connectors can be ribbon-like pieces of stainless steel that are formed integral with the flexure, so as to be extensions that extend from the gimbaled portion to the PZTs. When one PZT contracts and the other expands, the PZT that contracts pulls on one flexible connector, while the PZT that expands pushes on the flexible connector. Those tensile and compressive forces, respectively, pull and push the slider tongue in push/pull fashion to cause the gimbal tongue and hence the slider which is mounted thereon to rotate, thus realizing the desired fine movements of the slider over the data disk. The flexible connectors are strong enough in compression so as to not significantly buckle, thus allowing the PZTs to push on the slider tongue through the flexible connectors. At the same time, the ribbon-like connectors are flexible enough so that they do not significantly interfere with the gimballing action, thus allowing the gimbal to pitch and roll freely per the usual gimballing action of a suspension, and allowing the slider tongue to rotate in response to the push/pull action that the flexible connectors exert on the slider tongue.

Additionally, the PZTs are mounted at a slight angle with respect to the central longitudinal axis of the suspension. The gimbal includes outer gimbal struts, and bridge struts extending from and connecting the outer gimbal struts to the flexible connectors. The bridge struts connect to the flexible connectors at a position that substantially eliminates transverse (side-to-side) force on the slider tongue and hence substantially eliminates linear transverse motion of the slider as the slider rotates. This greatly decreases fretting wear on the dimple, which is of concern because fretting of the dimple produces particle shed, which particles can contaminate the disk drive and can even cause catastrophic head crashes.

The invention presents several advantages over various prior art DSA suspensions. In comparison to gimbal mounted PZT designs, because the PZTs of the present invention are attached at one end to a rigid part of the suspension that is relatively proximal compared to the gimbal, the design allows for higher stroke length (movement of the slider per voltage of input applied to the PZTs). The present design can also accommodate longer PZTs, and hence greater stroke, than certain prior art designs. Additionally, the PZTs are located far away from the slider compared to certain gimbal-mounted prior art designs. This improves shock lift-off performance, i.e., the amount of shock as measured in g-forces that the suspension can sustain in operation before the head slider lifts off the disk platter or crashes into the disk platter. Additionally, because of their stroke efficiency, single layer bulk parts can be used in the design instead of multi-layer bulk PZTs or thin film PZTs which are more expensive.

The inventors of the present invention have discovered a potential failure mechanism in GSA suspension designs including GSA designs as described in the foregoing, and have developed a GSA suspension design in which that potential partial or complete failure mode is reduced or eliminated.

In the GSA suspension of FIG. 4, the present inventors have discovered that during a shock event such as the disc drive experiencing a g-force shock when the drive is not being operated, the two corners of the slider that are located on the slider's leading edge can contact the stainless steel connector arms 230 that connect from the PZT microactuators to the gimbal. Those connector arms will be termed herein the "PZT connector arms." The leading edge of the slider is the edge of the slider which is the first edge to travel over a given location on a data storage medium such as the magnetic data disk during operation of the disk drive. In the figure the leading edge is the proximal edge of the slider, that is, the edge that is closer to the actuator arm to which the suspension is mounted. One failure that can occur due to such slider contact against the PZT connector arms is that the PZT connector arms can be bent so far that the disk drive ceases to function. Another failure than can occur due to such slider contact against the PZT connector arms is that the PZT experiences sufficient force such that it cracks and/or breaks, causing a complete failure of the PZT and thus a partial or complete failure of the disk drive. The amount of shock necessary to create this damage and concomitant failure is of a level that disk drives are generally designed to sustain only during non-operation rather than during operation. Such shock events will therefore generally be referred to herein as non-operational or non-op shock events.

In one aspect, the present invention proposes eliminating such failure mechanisms by locating the PZT connector arms laterally outward from the slider, such that the leading edge and the two associated corners of the slider have horizontal clearance from the PZT connector arms. This structure prevents the two corners on the leading edge of the head slider from striking the PZT connector arms during a shock event, and especially during a non-op shock event.

In another aspect, according to the present invention a vertical projection from the two corners of the slider on the leading edge of the slider do not pass through the PZT connector arms.

In another aspect of the invention, the only portions of the slider that are located over the PZT connector arms, are located distal of the outwardly extending struts that support the PZT connector arms. Thus, when those portions of the slider strike the PZT connector arms during an extreme non-op shock event, those PZT connector arms are supported and reinforced by those supporting struts, and therefore the slider contacting the PZT connector arms at that location does not significantly damage the arms.

Exemplary embodiments of the invention will be described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION

For discussion purposes, the present disclosure will refer to the microactuator as being "PZTs," although it will be understood that other types of microactuators could be used as well, and thus the invention is applicable to DSA suspensions using other types of micro actuators.

Figure 1:
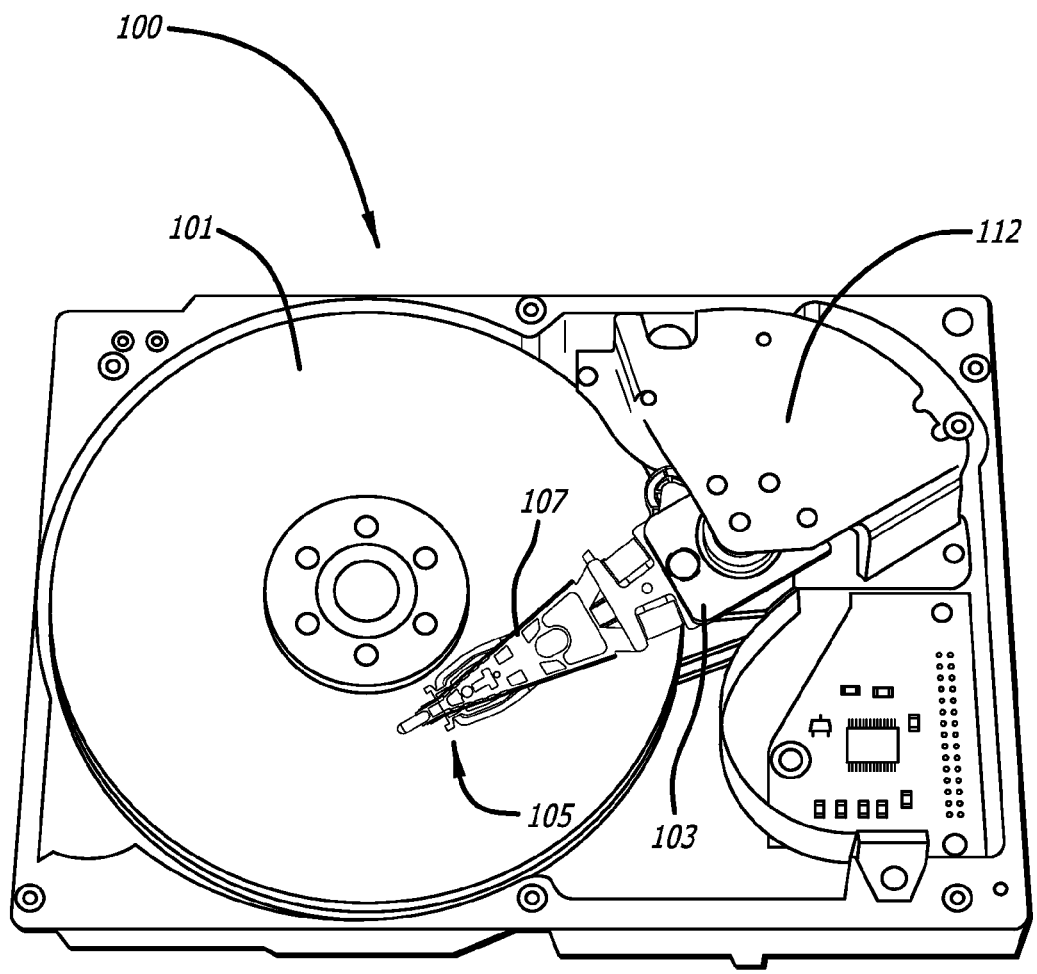
FIG. 1 is an oblique view of a prior art hard disk drive assembly with a DSA suspension.
Figure 2:
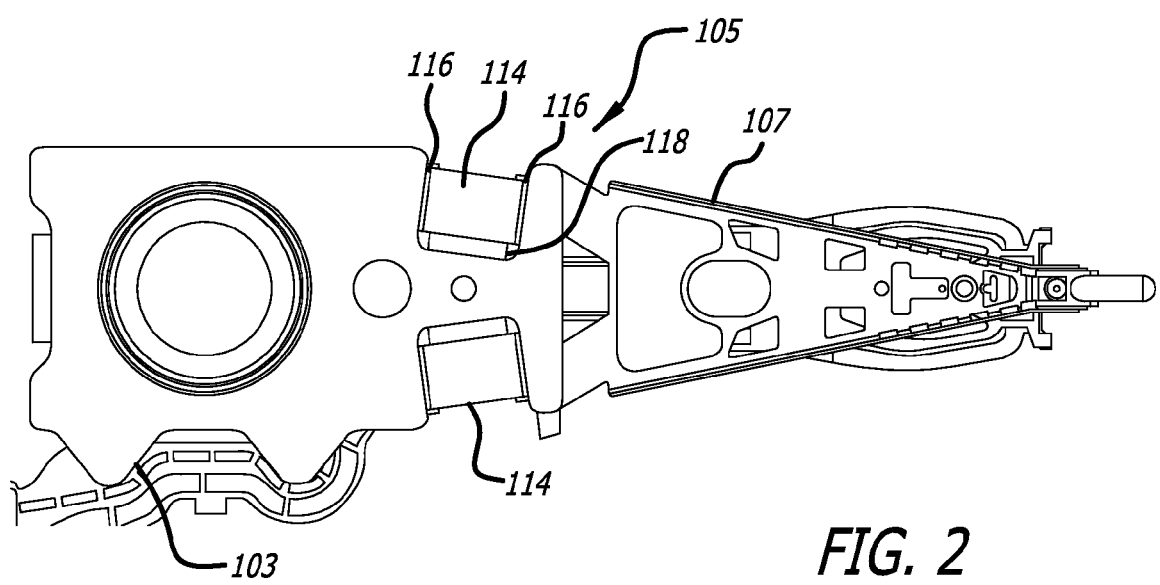
FIG. 2 is a top plan view of the prior art suspension 105 of FIG. 1.
Figure 3:
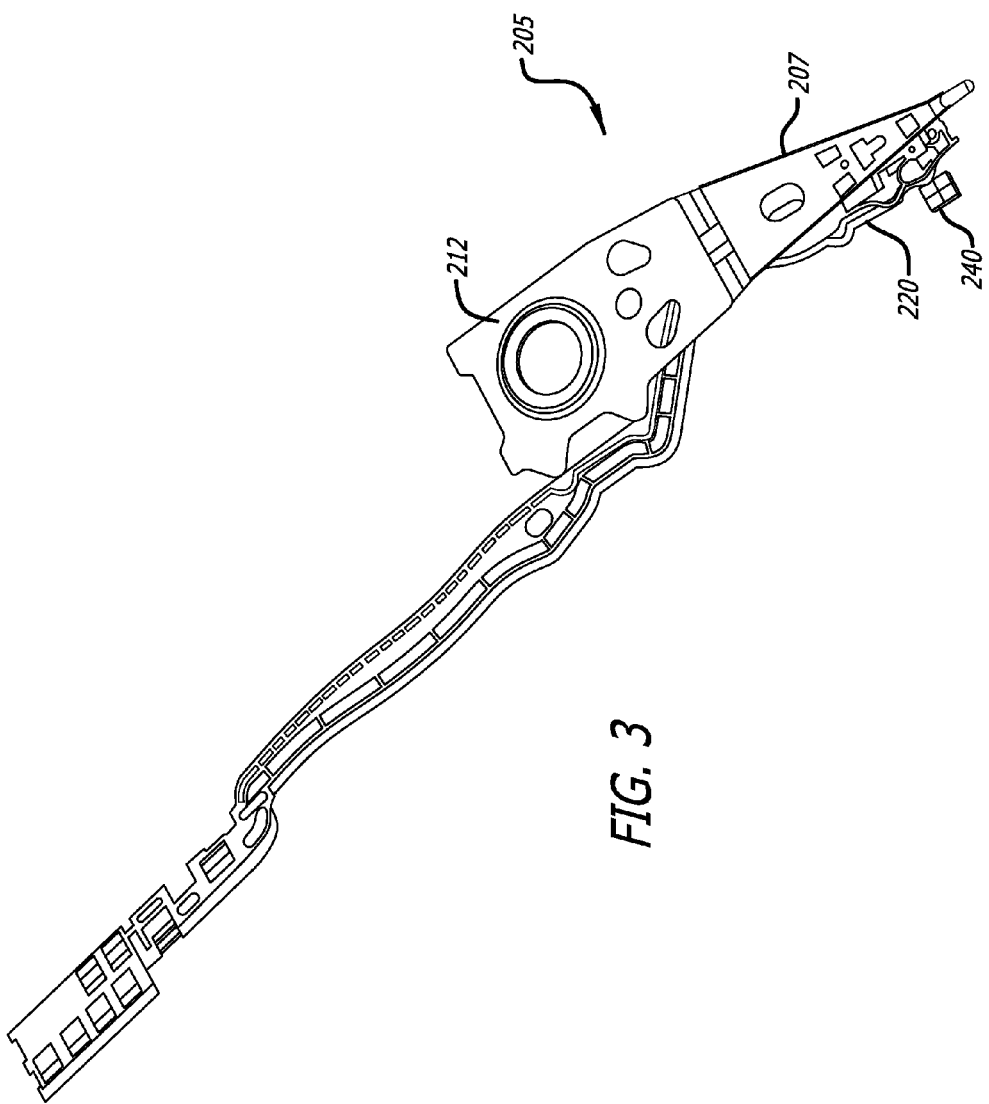
FIG. 3 is an oblique, partially exploded view of a DSA suspension according to an illustrative embodiment of the invention.

FIG. 3 is an oblique, partially exploded view of a DSA suspension according to an illustrative embodiment of the invention. Suspension 205 includes base plate 212, load beam 207, a flexure 220 welded or otherwise affixed to the load beam, and magnetic read/write head slider 240 affixed to the distal and gimbaled portion of flexure 220. For purposes of the present discussion, load beam 207 and the portion of flexure 220 rigidly affixed to load beam 207 will be referred to as being rigid or non-gimbaled.

Figure 4:
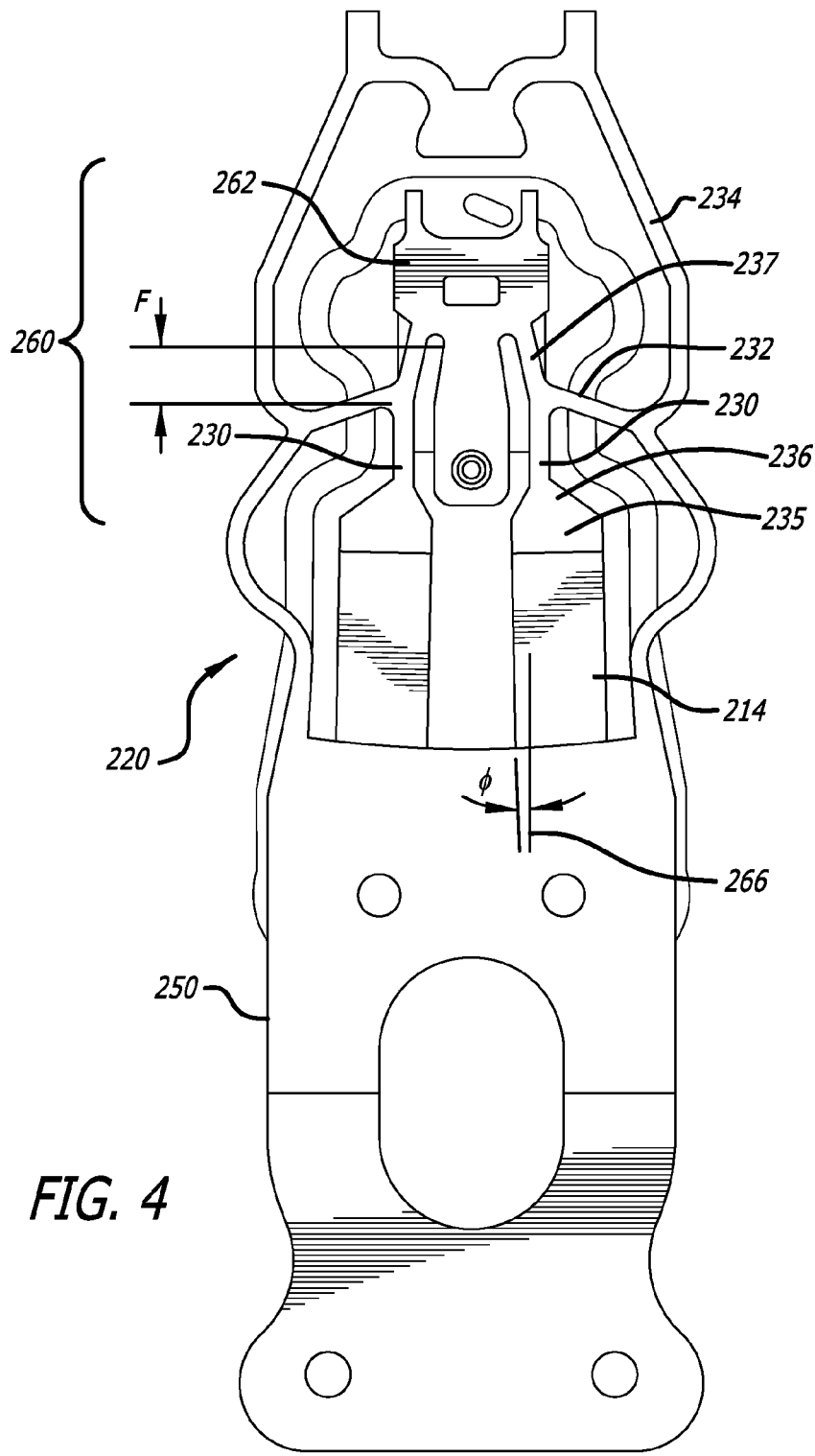
FIG. 4 is a top plan view of the flexure 220 of the suspension of FIG. 3, viewed from what is sometimes referred to as the "gimbal top."
Figure 5:
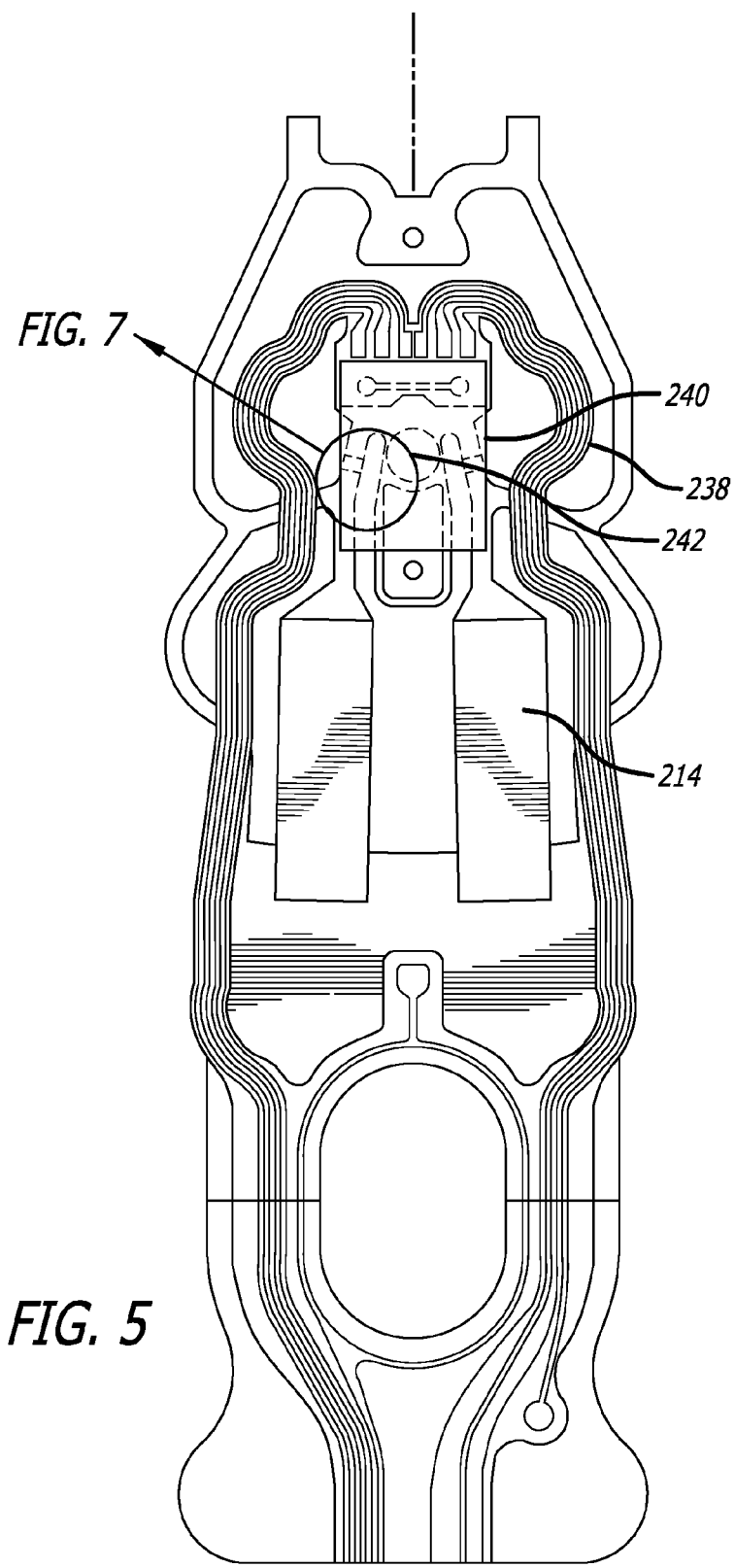
FIG. 5 is a bottom plan view of the flexure 220 of the suspension of FIG. 3, viewed from what is sometimes referred to as the "gimbal bottom."

FIG. 4 is a top plan view of the flexure 220 of the suspension of FIG. 3, viewed from what is sometimes referred to as the "gimbal top," and FIG. 5 is a bottom plan view of the flexure 220 of the suspension of FIG. 3, viewed from what is sometimes referred to as the "gimbal bottom." Flexure 220 typically includes rigid flexure base or non-gimbaled portion 250, a gimbaled portion 260 including slider tongue 262 to which a magnetic read/write head slider 240 is attached, a flexible electrical circuit 238, and a gimbal structure. The gimbal structure allows the gimbaled portion including slider tongue 262 to pitch and roll freely in response to surface irregularities in the data disk as the disk spins underneath slider 240. Slider 240 is supported for rotational movement in 3 degrees (pitch, roll, and yaw) by a dimple in load beam 207, at a location on load beam 207 that corresponds to dimple location 242 shown in FIG. 5. A number of various gimbal designs exist and are commercially used; in the illustrative embodiment shown, the gimbal takes the form of a ring gimbal including outer gimbal struts, or simply outer struts, 234. Bridge struts 232 connect from outer gimbal struts 234 to flexible connectors 230.

Flexible connectors 230 can be integrally formed with the rest of flexure 220. Flexible connectors 230 take the form of ribbon-like sections of the same stainless steel or other material from which flexure 220 is formed. Electrical circuit 238 which is formed as part of flexure 220 on the stainless steel substrate layer includes layers of an insulating material such as polyimide, copper alloy signal conductors on top of the polyimide, and an insulating and protective covercoat such as another insulative layer of polyimide over the copper signal conductors. Flexure 220 can be formed using either a subtractive process or an additive process. In an additive process, the layers are built up sequentially over the stainless steel layer into the patterns desired. In a subtractive process, the manufacture begins with a composite laminate of stainless steel/polyimide/copper and the various layers are selectively masked and etched away to form the desired flexure 220. Flexible connectors 230 may comprise only stainless steel over their whole lengths, or at least a majority of their lengths; they have no insulating material such as polyimide or copper for their entire lengths, or at least for a majority of their lengths. Alternatively, flexible connectors 230 may have insulating material such as polyimide on them so as to increase the stiffness of those connectors. The polyimide may be in controlled patterns on flexible connectors 230 so as to increase their stiffness to controlled extents at particular locations.

Flexible connectors 230 should be strong enough so that when pushed by a first PZT 214 in expansion, they do not buckle significantly. Rather, they transmit a compressive force to gimbaled portion 260. Meanwhile, the second PZT 214 contracts, pulling on its respective flexible connector. The two PZTs therefore operate in push-pull fashion to rotate slider tongue 262. At the same time, flexible connectors 230 should be sufficiently flexible so as to not interfere significantly with the gimballing action of the head slider 240, and allow the non-gimbaled portion 260 to rotate freely when PZTs 214 are actuated.

PZTs 214 or possibly some other type of microactuator are attached at their proximal ends to non-gimbaled flexure base 250, and at their distal ends are attached to flexible connectors 230 such as by either a solder or an epoxy, either non-conductive or conductive depending on whether electrical termination is to the stainless steel body of flexure 220 or to the flexible circuit 238.

Bridge struts 232 connect from outer gimbal struts 234 to flexible connectors 230 at a location that is a distance F distal of dimple center point dimple location 242. Distance F is preferably at least 0.05 mm, and preferably 0.05-0.25 mm. Other preferred dimensions are listed in provisional patent application No. 61/535,349 from which priority is claimed, and which is incorporated herein by reference. Additionally, PZTs 214 are mounted at a slight angle $\phi$ with respect to a central longitudinal axis 266 of the suspension, with the distal end of microactuators 214 being closer to central longitudinal axis 266 than the proximal ends of the microactuators. Preferably $\phi$ is at least 1 degree, and more preferably 2-12 degrees, and more preferably still about 2-4 degrees. The PZT line of action distance to dimple location can also influence both the stroke sensitivity and the dimple y-force.

The inventors discovered via analysis and extensive finite element analysis modeling that when the suspension is constructed according to the preferred dimensions, slider 240 experiences very little transverse (side-to-side) linear force and hence very little transverse movement when PZTs are actuated. Depending on the exact dimensions used for the flexure including the gimbal, the longitudinal distance F from the bridge strut connection point to the dimple location 242 can be adjusted to obtain negligible transverse linear force and movement of slider 240. The inventors were able to achieve a transverse force of <0.01% of the gram load of the suspension (i.e., <0.0002 gram for gram load of 2.0 gmf), and a transverse force of <0.01 gram per volt for each of the two microactuators. Since the design has low dimple y-force tendency, the contact friction force under the gram load (dimple contact force) is strong enough to hold the tongue and dimple together and act as a pivot (static friction condition, without sliding). Therefore, there is no significant transverse movement between dimple and tongue, and thus less fretting wear. By selecting the dimensions and angles properly, the designer can substantially eliminate transverse (side-to-side) force on the slider tongue and hence substantially eliminate linear transverse motion of the slider as the slider rotates. This greatly decreases fretting wear on the dimple.

Electrical connections from flexible circuit 238 to PZTs 214, and grounding of the PZTs through either electrical circuit 238 and/or to the stainless steel body of flexure 220, can be made by conventional methods that are well known, or by straightforward modifications to those methods.

Figure 6:
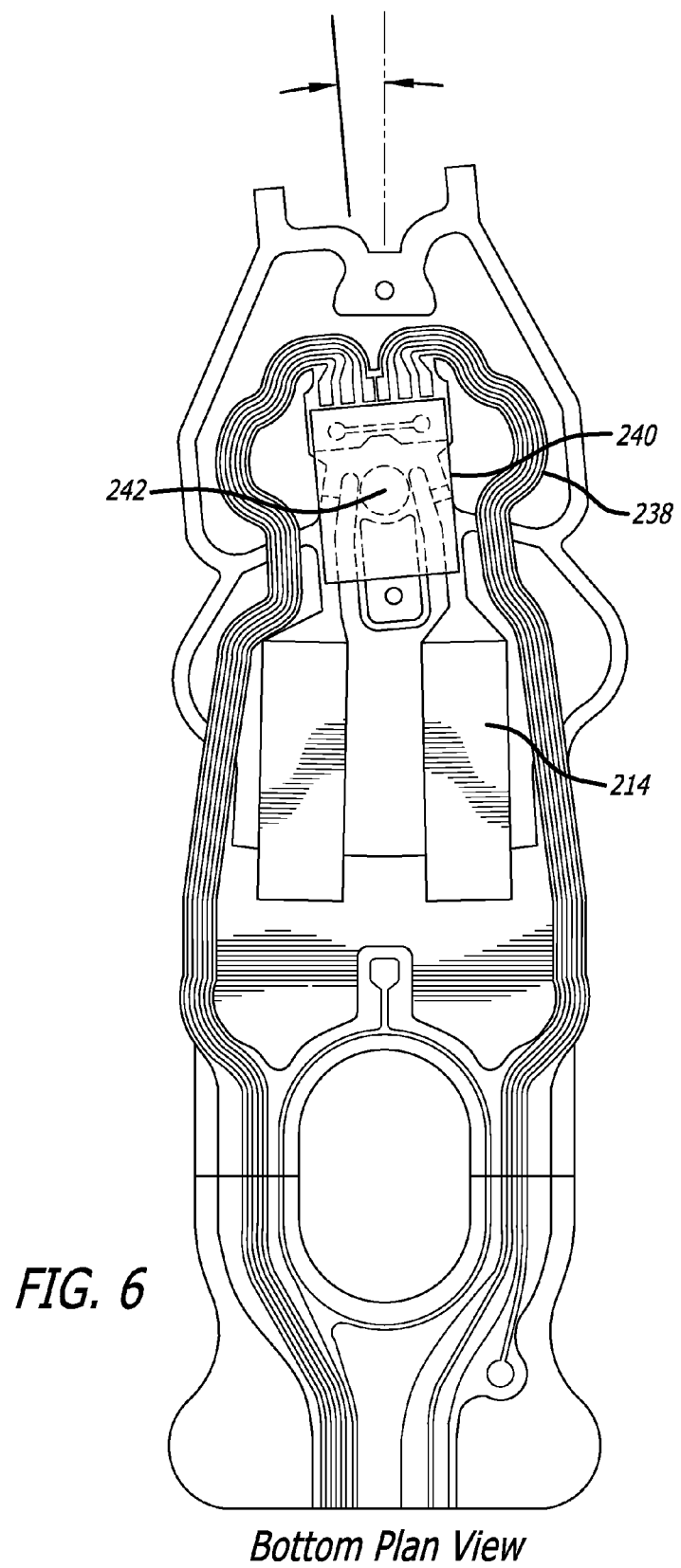
FIG. 6 is a bottom plan view of the flexure of FIG. 5 with the PZTs actuated in order to rotate the slider.

FIG. 6 is a bottom plan view of the flexure of FIG. 5 with the PZTs actuated and the slider 240 rotated by the action of the PZTs. Flexible connectors 230 are slightly bent, thereby allowing for the rotation. Slider 240 is essentially rotated in place about the dimple point with only negligible side-to-side linear movement, and thus experiences almost or essentially pure rotation about the dimple.

Figure 7:
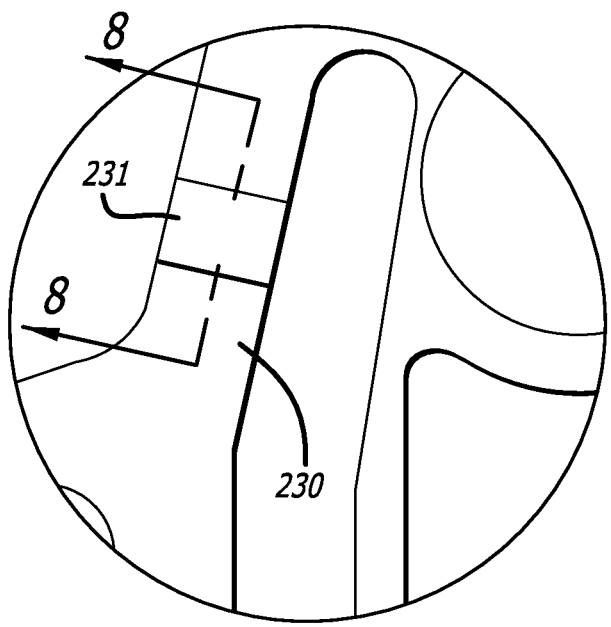
FIG. 7 is a close-up of the area around one of the flexible connectors 230 in FIG. 5.
Figure 8:
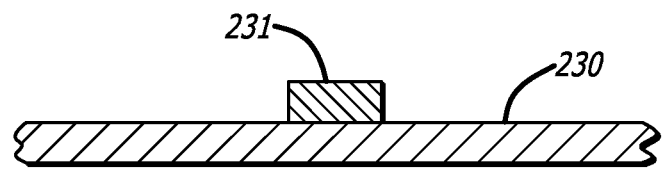
FIG. 8 is a cross section view taken alone section line 8-8' in FIG. 7.

FIG. 7 is a close-up of the area around one of the flexible connectors 230 in FIG. 5, and FIG. 8 is a cross section view taken alone section line 8-8' in FIG. 7, with slider 240 removed for clarity of illustration. Stainless steel flexible connector 230 has a dam 231 thereon. In the preferred embodiment, dam 231 is a dam of insulating material such as polyimide, defined by a raised mass of material. Polyimide dam 231 can be formed at the same time as the rest of the flexure is formed and does not require an additional manufacturing step. Raised dam 231 extends across the entire width, or substantially the entire width, of flexible connector 230. Polyimide dam 231 controls or stops the flow of slider adhesive from the slider area during manufacturing. More specifically, dam 231 helps to prevent the adhesive that is used to bond slider 240 to slider tongue 262 from wicking past dam 231, which could affect the mass, stiffness, and other characteristics of flexible connector 230 and/or bridge strut 232, and hence adversely affect the performance of the suspension.

Figure 9:
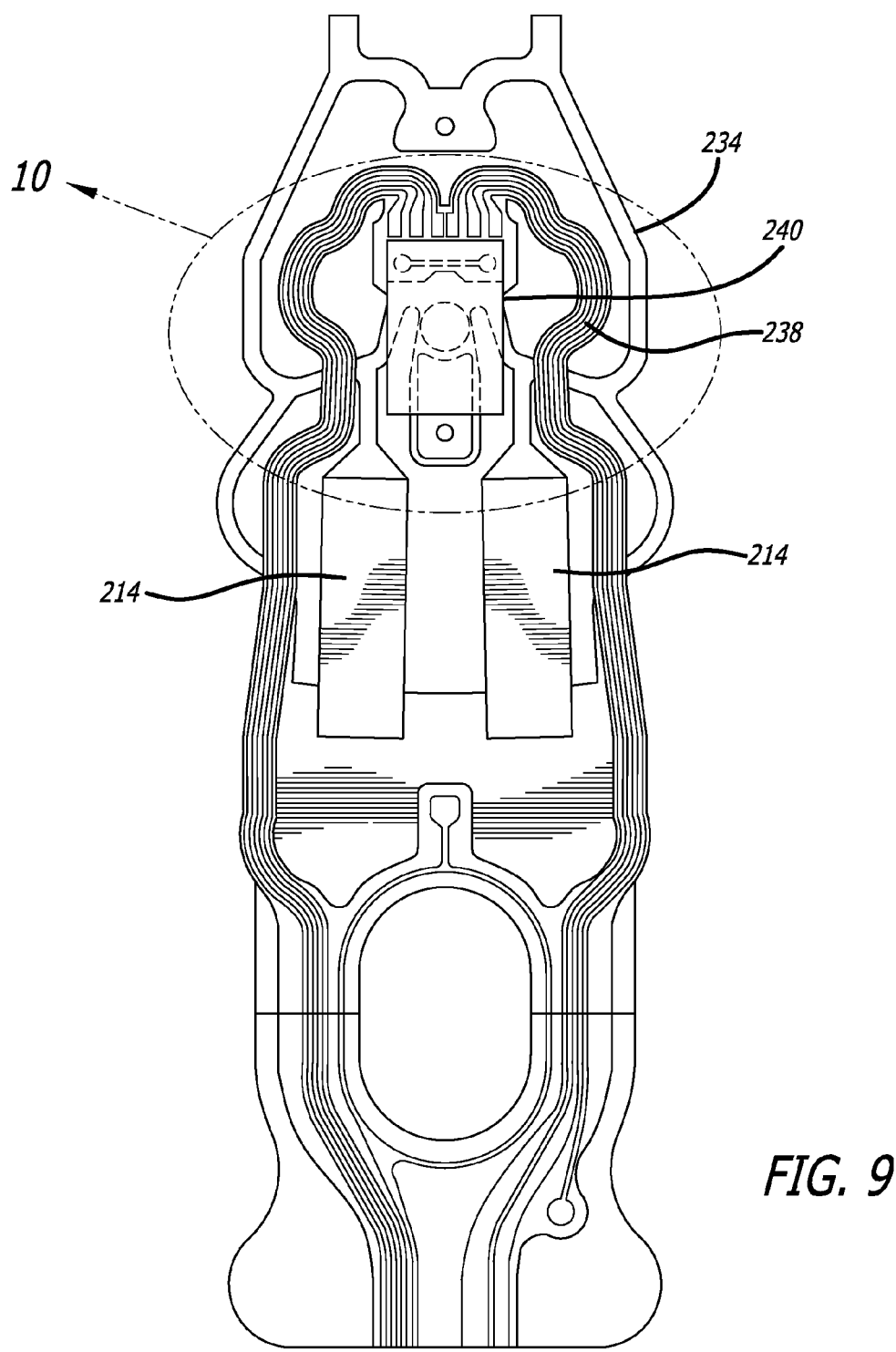
FIG. 9 is a bottom plan view of a flexure embodiment which has exhibits protection against g-shock damage.
Figure 10:
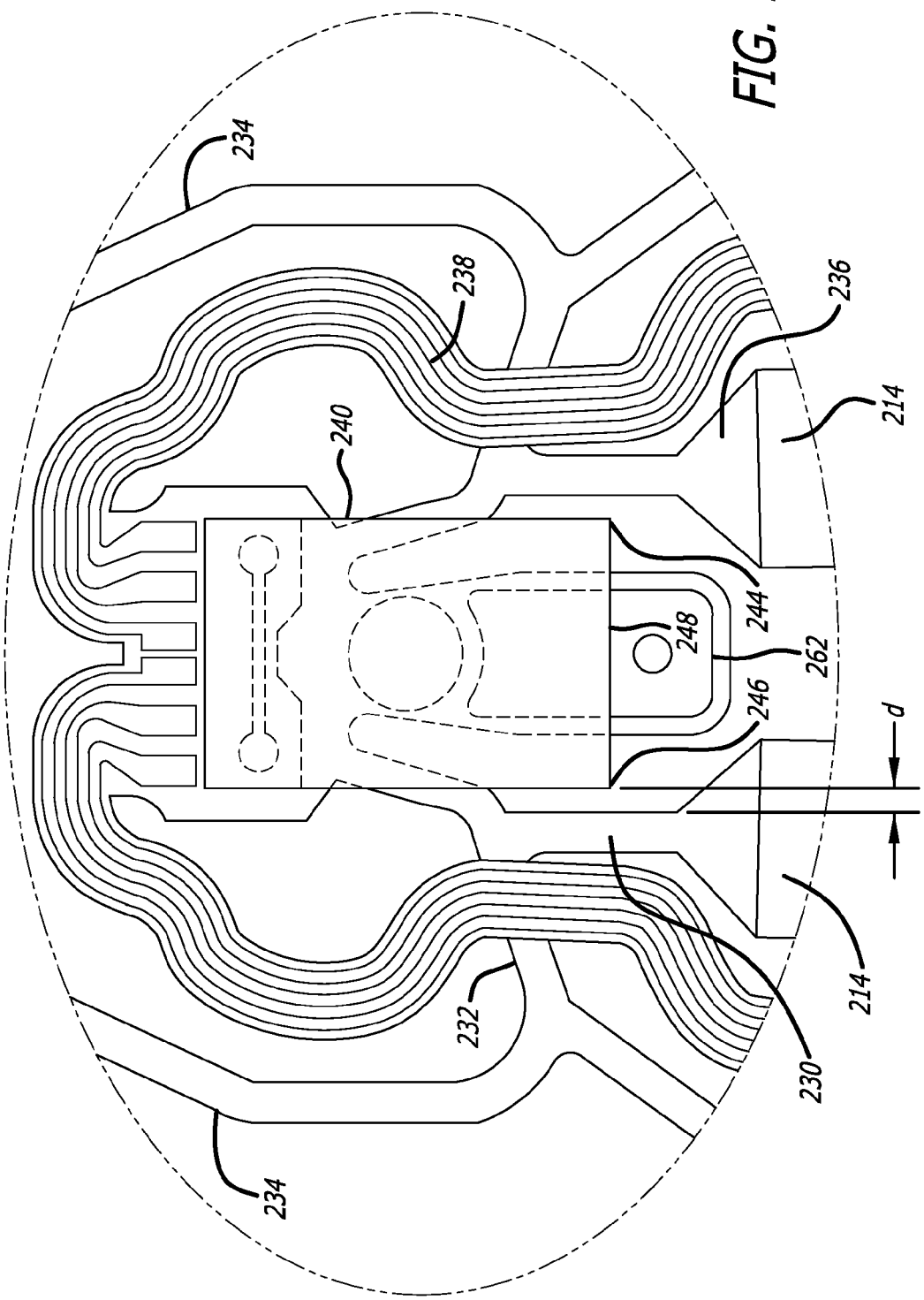
FIG. 10 is a closeup of the area in FIG. 9 around the leading edge of the head slider, as indicated in that figure.

FIG. 9 is a bottom plan view of a flexure embodiment which exhibits added protection against g-shock damage. FIG. 10 is a closeup of the area in FIG. 9 around the leading edge 248 of head slider 240, as indicated in that figure. The structure below head slider 240 is shown in shadow in order to reveal that structure. Slider 240 has leading edge 248 and first and second corners 244, 246 respectively, located at leading edge 248.

As best seen in FIG. 10, in this embodiment PZT connector arms 230, which extend in a generally distal direction from the microactuators to which they are respectively attached toward the gimbal, have been moved laterally outward such that there is a horizontal clearance distance d between the leading edge 248 of head slider 240, including corners 244 and 246 of leading edge 248, and PZT connector arms 230. A vertical line through either corner 244 or corner 246 does not pass through any part of PZT connector arms 230. Preferably clearance distance d is 20 µm or more. Connectors 230 are therefore disposed laterally outward of the head slider on either side thereof. A clearance distance d of approximately 30-50 µm, and more preferably about 40 µm, was found to constitute adequate clearance to prevent the slider from striking the connectors during a shock event, yet still produce satisfactory rotation of the slider when the PZTs were activated. The clearance distance is preferably large enough so that, even when the slider is rotated by activation of the PZTs as illustrated in FIG. 6, the leading edge 248 of the slider does not come to be positioned over any part of the connectors 230 in order to avoid damage during an operational shock event. Furthermore, the clearance distance is preferably large enough so that, even when the disk drive unit experiences a non-operational shock along one of the unit axes or in a sideways direction from the unit axes, the non-operational shock being equal in magnitude to the specified non-operational shock tolerance of the suspension itself and/or of the complete disk drive unit, the slider's leading edge 248 including its two corners 244, 246 does not contact the connectors 230.

Head slider 240 is bonded directly to slider tongue 260. leading edge 248 of head slider 240 including leading edge corners 244, 246 are not disposed below any parts of the suspension to which the slider 240 is not rigidly affixed, and thus cannot crash into any other parts of the suspension during a shock event. This arrangement thus prevents head slider 240, and more particularly the slider's leading edge 248 and its two corners 244, 246 from crashing into or otherwise contacting the connectors 230 that transmit microactuation forces from the PZTs to the gimbaled region 260 of the suspension during a shock event, such as a predetermined non-operational shock tolerance of the suspension and/or the disk drive.

As previously discussed, connectors 230 are flexible enough so that they do not significantly interfere with the gimballing action at the slider. In the embodiments shown, connectors 230 are narrower than the PZTs 214 whose expansion and contraction forces they transmit to the gimbaled region, at the points at which connectors 230 are disposed laterally outward of the leading edge 248 of head slider 240. The elements are arranged in the following lateral (horizontal) order: a first ribbon-like PZT connector 230 that is narrower than its associated PZT 214; a first clearance space; slider 240 including its leading edge 248; a second clearance space; and a second ribbon-like PZT connector 230 that is narrower than its associated PZT 214.

It is anticipated that the embodiment of FIGS. 9 and 10 will also include an adhesive dam such as the adhesive dam 231 shown in FIGS. 5-8.

Figure 11:
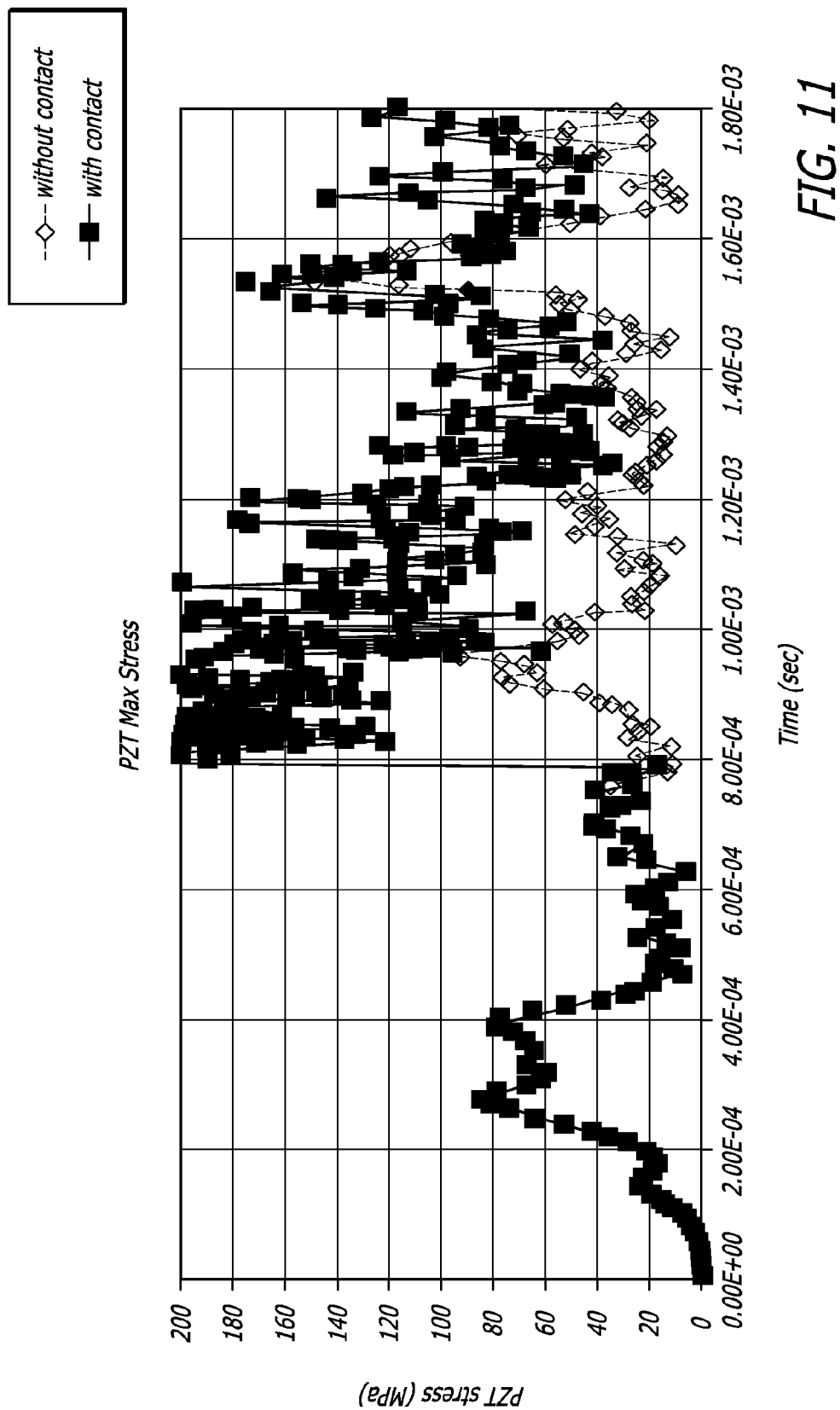
FIG. 11 is a graph of PZT maximum stress vs. time for a suspension according to the prior design of FIG. 5 and a suspension according to the design of FIG. 9, according to a simulation.

FIG. 11 is a graph of PZT maximum stress vs. time for a suspension according to the prior design of FIG. 5 and for a suspension according to the design of FIG. 9, according to a simulation. As can be seen in the graph, a PZT of the suspension according to the invention experiences considerably less maximum stress during a non-operational shock event than does a PZT of the prior suspension.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, PZT microactuators have been proposed to be placed at locations on a suspension other than the gimbal region, and the invention should therefore not be considered to be limited to a DSA suspension having a co-located microactuator. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuator type suspension for a disk drive, the suspension comprising:
   a load beam;
   a gimbaled portion including a head slider, the gimbaled portion being attached in gimbaled fashion to the load beam so that the head slider pitches and rolls freely in response to surface irregularities in a surface of a data disk as the data disk travels underneath the head slider;
   a linear microactuator having a first end and a second end opposite the first end, the linear microactuator being attached at its first end to a non-gimbaled portion of the suspension; and
   a connector having a first end and a second end, the first end of the connector being attached to the second end of the microactuator, and the second end of the connector being attached to the gimbaled portion of the suspension;
   wherein when the linear microactuator contracts, it pulls the connector which in turn pulls the gimbaled portion thereby rotating the gimbaled portion to effect fine movements of the head slider; and
   wherein there is horizontal clearance between the head slider and the connector such that the head slider does not contact the connector during a vertical shock event.

2. The suspension of claim 1 wherein the connector is attached directly to a gimbal tongue of the suspension to which the head slider is affixed.

3. The suspension of claim 1 wherein the vertical shock event is within a predefined vertical shock tolerance of the suspension.

4. The suspension of claim 3 wherein the vertical shock event is within a predefined vertical non-operational shock tolerance of the suspension.

5. The suspension of claim 3 wherein the vertical shock event is within a predefined vertical non-operational shock tolerance of the disk drive.

6. The suspension of claim 1 wherein the connector is narrower than the linear microactuator whose contraction causes the gimbaled portion to rotate.

7. The suspension of claim 1 wherein the horizontal clearance is sufficiently large such that even when the linear microactuator is activated so as to rotate the gimbaled portion, the head slider remains horizontally separated from the connector.

8. A dual stage actuator type suspension for a disk drive, the suspension comprising:
   a load beam;
   a gimbaled portion including a gimbal tongue and a head slider affixed thereto, the gimbaled portion allowing the head slider to pitch and roll freely in response to surface irregularities in a surface of a data disk as the data disk travels underneath the head slider; and
   a linear microactuator for affecting fine movements of the head slider;
   the head slider having a leading edge, the leading edge being defined as an edge of the slider which is the first portion of the head slider to travel over a given location on a data storage medium over which the slider travels during operation of the disk drive;
   wherein the leading edge of the slider is not positioned under any portion of the suspension to which the slider is not rigidly affixed.

9. The suspension of claim 8 further comprising a connector extending from a distal end of the linear microactuator to the gimbaled portion of the suspension, the connector being integrally formed with the gimbaled portion, and wherein the leading edge of the slider is not positioned under any portion of the connector.

10. The suspension of claim 9 wherein the connector comprises stainless steel.

11. The suspension of claim 9 wherein the connector is attached directly to a gimbal tongue of the suspension to which the head slider is affixed.

12. The suspension of claim 9 wherein the connector comprises a flexible ribbon of stainless steel.

13. The suspension of claim 8 wherein the leading edge of the slider does not contact any other part of the suspension when the suspension experiences a non-operational shock that is within a predefined non-operational shock tolerance of the suspension.

14. The suspension of claim 8 wherein the leading edge of the slider does not contact any other part of the suspension when the disk drive experiences a non-operational shock that is within a predefined non-operational shock tolerance of the disk drive.

15. The suspension of claim 8 wherein, even when the linear microactuator is activated so as to rotate the gimbaled portion, the leading edge of the slider is not positioned under any portion of the suspension to which the slider is not rigidly affixed.

16. A dual stage actuator type suspension for a disk drive, the suspension comprising:
   a proximal rigid portion;
   a flexure connected to the rigid portion, the flexure including a gimbal;
   a head slider mounted to the gimbal for reading data from, and writing data to, a spinning data disk;
   first and second piezoelectric microactuators mounted on the flexure; and
   first and second flexible stainless steel connectors connecting respective distal ends of the piezoelectric microactuators to the gimbal, at least a portion of the flexible stainless steel connectors extending in a generally distal direction from the microactuators and laterally outward of the head slider on either side thereof;
   wherein when the microactuators are actuated, they act on the gimbal through the flexible stainless steel connectors to rotate the gimbal and thereby effect fine movements of the head slider; and
   wherein there is horizontal clearance between a leading edge of the head slider and the flexible stainless steel connectors on either side thereof, such that the head slider does not contact the connectors during a vertical shock event.

17. The suspension of claim 16 wherein the connectors comprise flexible ribbons that are narrower than the microactuators to which they are connected.

18. The suspension of claim 16 wherein the connectors comprise flexible ribbons that are narrower than the microactuators to which they are connected at points at which the flexible ribbons are disposed laterally outward of the leading edge of the head slider.

19. The suspension of claim 16 wherein components of the suspension and clearance spaces therebetween are arranged in the following horizontal order: the first flexible stainless steel connector, a first clearance distance, the leading edge of the head slider, a second clearance distance, and the second flexible stainless steel connector.

20. The suspension of claim 19 wherein the first and second clearance distance are each greater than or equal to 20 μm.

* * * * *